United States Patent [19]

Watanabe

[11] Patent Number: 4,711,335

[45] Date of Patent: Dec. 8, 1987

[54] DISPLAY DEVICE FOR AN ESCALATOR

[75] Inventor: Eiki Watanabe, Inazawa, Japan

[73] Assignee: Mitsubishi Denki Kabushiki Kaisha, Japan

[21] Appl. No.: 903,378

[22] Filed: Sep. 3, 1986

[30] Foreign Application Priority Data

Sep. 5, 1985 [JP] Japan ................................ 60-196224

[51] Int. Cl.[4] .......................... B65G 17/00; B66B 9/00

[52] U.S. Cl. ...................................................... 198/324

[58] Field of Search ........................ 198/333, 324, 321; 187/130, 135, 136, 140; 340/765, 784; 350/340, 341; 40/542, 544, 548

[56] References Cited

U.S. PATENT DOCUMENTS

| | | | |
|---|---|---|---|
| 3,718,382 | 2/1973 | Wysocki et al. | 340/784 |
| 3,944,331 | 3/1976 | Janning | 350/341 |
| 4,002,404 | 1/1977 | Dir | 350/341 X |
| 4,022,296 | 5/1977 | Mandel et al. | 187/135 |
| 4,137,524 | 1/1979 | Chen et al. | 340/765 |
| 4,326,622 | 4/1982 | Ellzey | 198/333 X |

*Primary Examiner*—James L. Rowland
*Assistant Examiner*—Brian R. Tumm

[57] ABSTRACT

An elevator such as an escalator having a display device presenting, whenever necessary, a display of matters to be noted upon a predetermined special operation (for example, when conveying a wheelchair) while making the display disappear during normal operation of the escalator so as to avoid unsightly appearance. This is also effective in preventing the inadvertent overlooking of the matters displayed. The display device comprises a liquid crystal layer; a pair of electrodes disposed on opposite sides of the liquid crystal layer, one of the electrodes being a transparent pattern electrode having a pattern corresponding to the display of the matters that should be taken note of, the other electrode being a transparent common electrode; and an electric power source for supplying electricity to the electrodes. A switch is operable to shift the escalator between the operation modes and is connected between the electric power source and the electrodes to normally interrupt the electric power supply to the electrodes so that the liquid crystal layer does not display any matters to be noted and also to supply electric power to the electrodes whenever necessary so that the liquid crystal layer displays matters to be noted.

5 Claims, 4 Drawing Figures

FIG. 4 PRIOR ART

MATTERS TO BE NOTED BY OPERATORS

OPERATOR MUST FOLLOW PROCEDURES DESCRIBED
BELOW FOR WHEELCHAIR CONVEYANCE

1. USING A GAUGE FIRST CHECK WHETHER WHEELCHAIR DIMENSIONS ARE SUITABLE FOR RIDING ESCALATOR.

2. DURING WHEELCHAIR CONVEYANCE OPERATION, CHAIN OFF ENTRANCE AND HANG A CAUTION SIGN THEREFROM TO PREVENT UNAUTHORIZED PERSONS FROM GETTING ON ESCALATOR.

3. WHEN PUTTING WHEELCHAIR ON STEPS:
*OPERATOR SHOULD MANUALLY MOVE WHEELCHAIR ONTO STEPS AFTER THEY HAVE COMPLETELY STOPPED (WITH WHEEL STOP PROJECTED) AND CHIMES HAVE CEASED. OPERATOR SHOULD ENSURE THAT WHEEL-CHAIR IS NEVER PUT ON STEPS BY WHEELCHAIR BOUND HIMSELF OR BY HIS ATTENDANT(S);
*TURN OFF POWER ON WHEELCHAIR BEFORE PUTTING ON STEPS;
*LOCATE WHEELCHAIR AT CENTRAL PORTION OF ZONE DEFINED BY GREEN LINES AND APPLY BRAKE.

4. WHEN GETTING WHEELCHAIR OFF ESCALATOR:
*RELEASE BRAKE AND MANUALLY PUSH WHEELCHAIR OFF AFTER STEPS HAVE COMPLETELY STOPPED;
*TAKE ELECTRIC WHEELCHAIRS OFF WITH THEIR POWER OFF.

5. WHEELCHAIR BOUND SHOULD FACE DIRECTION OF MOVEMENT WITH OPERATOR STANDING BEHIND.
DURING MOVEMENT, OPERATOR AND WHEELCHAIR BOUND SHOULD GRIP BOTH HANDRAILS.

DISPLAY DEVICE FOR AN ESCALATOR

BACKGROUND OF THE INVENTION

1. Field of the Invention

This invention relates to a display device for an escalator system particularly adapted to convey wheelchairs, and more specifically to a display device for displaying matters requiring passenger's attention particularly upon special conveyance operations such as conveying wheelchairs.

2. Description of Prior Art

In the past, a display device for an escalator system capable of conveying wheelchairs has been known. Such a conventional escalator system is schematically shown in FIG. 2. The escalator system illustrated includes a multitude of ordinary steps 1 continuously arranged along a recirculating path, first, second and third special steps 2, 3 and 4 successively arranged in the longitudinal direction or direction of conveyance for carrying thereon a wheelchair, an adjusting means 5 for selectively adjusting the special steps 2 to 4 to a normal step position in which the special steps act as normal steps or to a special step position in which the special steps are set in a manner such that a person sitting in a wheelchair can ride on the special steps, a pair of balustrades 7, and an operation panel 8 mounted on the inner surface of one of the balustrades 7 for controlling the operation of the escalator system at the time when a person in a wheelchair uses the escalator system.

As shown in FIG. 3, the operation panel 8 has an operation button 9, a riding button 10 and a levelling button 11 mounted thereon which are all adapted to be used by the wheelchair bound. The riding button 10 is adapted to be pushed after a user of a wheelchair has embarked on the special steps 2 to 4 so as to start the preparations for the wheelchair operation of the escalator system while simultaneously sounding a chime. That is, upon pressing of the riding button 10, the adjusting means 5 is operated to adjust the special steps 2 to 4 in a manner such that the special steps can convey a wheelchair.

The wheelchair operation button 9 is pressed by the wheelchair passenger after the chime stops, whereby the escalator begins to operate.

The levelling button 11 is pressed by the wheelchair passenger when a warning buzzer is actuated by the special steps 2 to 4 moving out of their normal stopping positions. Upon pushing the levelling button 11, the special steps 2 to 4 are moved to a predetermined zone for correction of their positions to simultaneously deactivate the buzzer while sounding a chime.

In FIG. 2, provision is made for display panels 12 each of which is adapted to display matters to be noted by an operator during the wheelchair conveyance operation of the escalator system. The display panels 12 are mounted, for example, on appropriate side panels near an entrance and an exit of the escalator, and each have a written description of the matters to be noted by an operator at the time when the wheelchair bound are being conveyed on the escalator system.

Accordingly, in cases where a wheelchair bound person is being conveyed, an operator is required to operate the escalator while making sure that the matters requiring note described on the display panel 12 are carried out in sequence. Also, these procedures set forth in the display panel 12 must be attended to so as to avoid any possible danger which might otherwise take place during the conveyance of wheelchair bound by the escalator system.

Further, at the time of wheelchair conveyance operation of the escalator system, an operator operates by key a changeover switch (not shown) mounted on an appropriate location such as a skirt guard at the entrance or exit of the escalator system so as to change the escalator operation to that for wheelchair conveyance so that the special steps 2 to 4 are stopped at the lower entrance where a wheelchair passenger is waiting.

In this state, the wheelchair passenger gets on the special steps 2, 3 and then pushes the riding button 10 on the operation panel 8 so that the adjusting means 5 is operated to fix the special steps 2, 3 with each other through a fork (not shown) to form one and the same plain. At the same time, a wheel stop *2a* is projected for preventing the wheelchair from falling out from the special steps 2 and 3, and the special step 4 is set at an inclined position, as illustrated in FIG. 2.

In this case, however, if the stop positions of the special steps 2 to 4 are moved out of their normal positions and a warning device is operated to warn of such a situation, it is necessary for the operator to push the levelling button 11 so as to move the special steps to a predetermined zone for correction of their positions. Upon finishing of such correction, the warning stops and a chime sounds to inform of this.

On the other hand, after the escalator system has completed preparations for the wheelchair conveyance operation, the wheelchair operation button 9 is pushed by the operator so that the escalator system begins to move upward at a half normal operating speed, that is at a speed of 15 m per minute. During this upward movement, the special step 4 is inclined so as to avoid contact with the foot rest of the wheelchair. When the special steps 2 to 4 come to the upper landing, the operation of the escalator system is automatically stopped and the wheel stop is released so that the wheelchair and passenger can get off the escalator system. Thereafter, the changeover switch (not shown) is operated by an operator to return the escalator system to its ordinary operating state.

With the above-described conventional display device utilized for the wheelchair operation of an escalator system, however, the matters to be noted are described on a panel formed of synthetic resin or on a film formed of synthetic resin by an appropriate means such as printing, and the panel or film having such matters thus described thereon is adhered to a wall surface near the escalator system, or a balustrade side panel of the escalator system in order for an operator to read the matters with ease. For this reason, the display of such matters, which is not required for the ordinary operation of the escalator system, degrades the appearance of the wall surface or the balustrade side panel. There is also the fear that having become accustomed to such a display, one is liable to overlook it at necessary moments. On the other hand, an operator can always carry a note having thereon the matters to be noted, but it is very cumbersome and inefficient for him to take out and read such notes whenever necessary.

SUMMARY OF THE INVENTION

In view of the above, the present invention is intended to obviate the above-mentioned problems of the prior art and has for its object the provision of a display device for an elevator system which is capable of presenting, whenever necessary, a display of matters to be noted upon a special operation such as, for example, a wheelchair conveyance operation of the elevator system such as an escalator system, while making such a display disappear during the ordinary operation of the elevator system so as to avoid an unsightly appearance, and which is also effective in preventing an inadvertent oversight of the matters displayed.

In order to achieve the above object, according to the present invention, there is provided a display device for an elevator system for displaying matters to be noted for varying operations of the elevator system, the display device comprising:

a liquid crystal layer;

a pair of electrodes disposed on the opposite sides of the liquid crystal layer, one of the electrodes being a transparent pattern electrode having a pattern corresponding to a display of the matters to be noted, the other electrode being a transparent common electrode;

an electric power source for supplying electricity to the electrodes; and a switch connected between the electric power source and the electrodes and adapted to normally interrupt the electric power supply to the electrodes so that the liquid crystal layer does not display the matters to be noted, but permit the supply of electric power to the electrodes whenever necessary so that the liquid crystal layer can display the matters to be noted.

The display device for an elevator system may further comprise:

a transparent base panel to which one of the electrodes is attached; and a transparent coating layer covering the other of the electrodes.

It is preferable that the elevator system have two operation modes, one for normal operation and the other for a predetermined special operation, and that the switch be operated, when the elevator system has been changed to the special operation mode, to connect the electric power source with the electrodes for supply of electric power.

In a preferred embodiment, the elevator system comprises an escalator system having a balustrade provided with a transparent side panel, the display device being adapted to be mounted on the balustrade side panel.

In this case, the escalator system has two operation modes, one for ordinary passenger conveyance operation and the other for a special wheelchair conveyance operation, the display device being adapted to display matters to be noted by means of the liquid crystal layer during the wheelchair conveyance operation of the escalator system.

A pair of molecular orientation layers may be interposed between the liquid crystal layer and the electrodes, respectively.

The above and other objects, features and advantages of the present invention will become apparent from the following detailed description of a presently preferred embodiment of the invention when taken in conjunction with the accompanying drawings.

BRIEF DESCRIPTION OF THE DRAWINGS

FIG. 4 is a front elevational view of a conventional display panel.

DESCRIPTION OF THE PREFERRED EMBODIMENT

In the following, description will be made of the case in which the present invention is applied to a display device for an escalator system.

Figure 1:
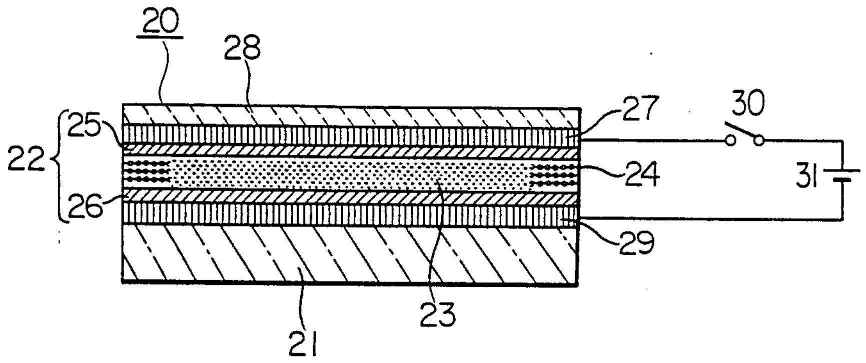
FIG. 1 is a schematic cross-sectional view showing a display device for an elevator system in accordance with an embodiment of the present invention.
Figure 2:
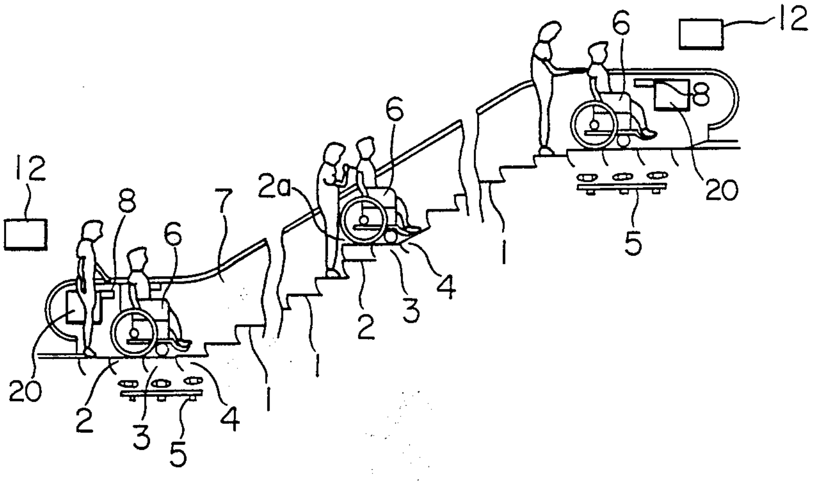
FIG. 2 PRIOR ART
FIG. 2 is a schematic cross-sectional view showing a conventional escalator system during the wheelchair conveyance operation thereof and a display device of the invention mounted in the balustrade side panel.
Figure 3:
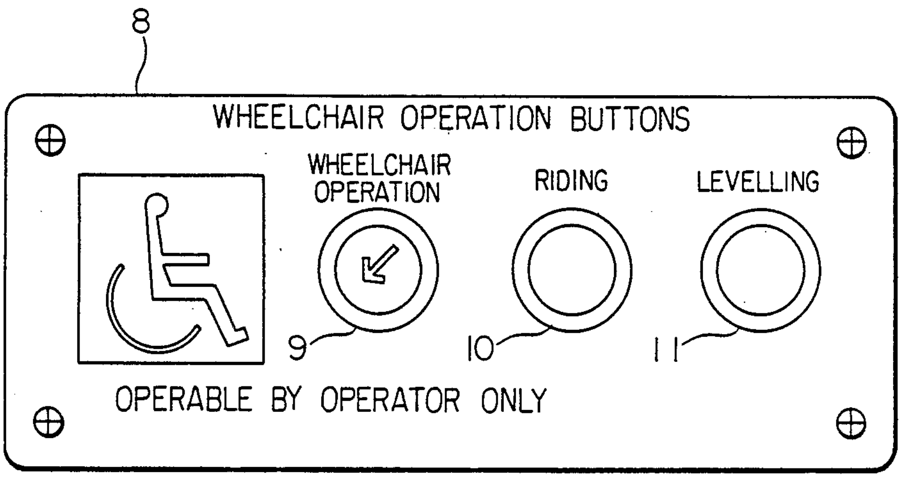
FIG. 3 PRIOR ART
FIG. 3 is a front elevational view of a conventional operation panel for the wheelchair conveyance operation of the escalator system.

In FIG. 1, there is shown a display board 20 for displaying matters to be noted during the wheelchair conveyance operation of an escalator system, the display board 20 being adapted to be mounted on a transparent side panel which constitutes a part of a balustrade of the escalator system. The display board 20 comprises a base panel 21 formed of transparent glass, and a liquid crystal panel 22 adhered to the glass base panel 21 for indicating the matters to be noted.

The liquid crystal panel 22 comprises a liquid crystal layer 23 having a thickness of 10 microns or therearound, a seal member 24 adapted to seal the peripheral sides of the liquid crystal layer 23, a pair of upper and lower molecular orientation layers 25, 26 covering the upper and lower surfaces of the liquid crystal layer 23, respectively, a transparent pattern electrode 27 formed on one surface (the upper surface in FIG. 1) of the molecular orientation layer 25, a coating layer 28 covering the upper surface of the pattern electrode 27, and a transparent common electrode 29 formed on one surface (the lower surface in FIG. 1) of the lower molecular orientation layer 26. As shown in FIG. 4, the pattern electrode 27 forms letters describing the matters to be noted. Connected between the pattern electrode 27 and the common electrode 29 is a direct current source 31 with a pair of switch contacts 30 inserted between the direct current source 31 and the pattern electrode 27. The switch contacts 30 are, for example, those of a relay which is adapted to be energized into a connected state when a changeover switch (not shown) of the escalator system is switched over to a wheelchair conveyance operation.

With the display device for an escalator system as constructed in the above manner, when an operator operates the changeover switch (not shown) so as to change the escalator operation to the wheelchair conveyance operation when the escalator is to be utilized by a wheelchair bound person, the switch contacts 30 are closed so that a voltage from the direct current source 31 is imposed between the pattern electrode 27 and the common electrode 29. As a result, letters on the liquid crystal layer 23 formed by the pattern electrode 27 are made opaque or the portions other than the letters on the liquid crystal layer 23 are made opaque whereby the respective letters describing the matters to be noted are clearly displayed such that they can be visually discerned, as shown in FIG. 4.

Accordingly, the operator need only perform the prescribed operations for the wheelchair conveyance of the escalator in accordance with the matters to be noted displayed on the display board 20.

Thereafter, when the operator switches over the changeover switch (not shown) to an ordinary operation side after the wheelchair bound person gets off the escalator system upon completion of the wheelchair conveyance operation, the escalator system will return to the ordinary operating mode and the switch contacts 30 are opened so that the letters displayed on the display board 20 disappear. In this state, the display board 20 is transparent and thus blends in with the transparent side panel of the escalator balustrade so that the appearance of the balustrade will not be degraded, avoiding the unsightly look of the display board 20.

In addition, on the display board 20 there appears a display of the note-requiring matters upon the wheelchair conveyance operation of the escalator system, and therefore, the cautioning effects to the operator are remarkable and the attentiveness of the operator to the matters requiring note displayed on the display board 20 is greatly improved, thus materially reducing the inadvertent overlook of such matters.

Although in the illustrated embodiment, the display device of the present invention has been described as being applied to an escalator system, it is not limited to this application but may, of course, be likewise applicable to a general-purpose elevator such as a passenger elevator or a freight elevator.

As will be understood from the foregoing description, according to the present invention, a display on a display board for displaying matters to be noted for varying operations of an elevator system is made of a transparent liquid crystal pattern, and such note-requiring matters can be displayed on the display board only when necessary, and are otherwise made to disappear so that the board blends in with the environment therearound in which the display board is installed. Accordingly, there will be no fear of the display board degrading the aesthetic appearance of the surrounding environment, and the display board, when displaying the note requiring matters, has a satisfactory attractive effect on the operator, thereby substantially reducing the careless or inadvertent overlooking of the matters as displayed.

What is claimed is:

1. An elevator comprising:

an escalator having balustrade side panels;

switch means mounted on one of said balustrade side panels and operable to shift said escalator between operation modes;

a display device actibatable for displaying matters to be noted for operating said escalator in one of the operation modes;

circuit means connecting said switch means to supply power from an electric power source to said display device when said switch means is operated to the one of the operation modes to activate said display device, said display device comprising:

a liquid crystal layer;

a pair of electrodes disposed on the opposite sides of said liquid crystal layer, one of said electrodes being a transparent pattern electrode having a pattern corresponding to a display of the matters to be noted, the other electrode being a transparent common electrode;

wherein said switch means is connected by said circuit means between the electric power source and said electrodes and interrupts the electric power supply to said electrodes so that said liquid crystal layer does not display any indication of the matters to be noted during another of the operation modes and connects the electric power source to said electrodes so that said liquid crystal layer displays the matters to be noted during the one of the operation modes.

2. An elevator as claimed in claim 1, said display device further comprising:

a transparent base panel to which one of said electrodes is attached; and a transparent coating layer covering the other of said electrodes.

3. The elevator as claimed in claim 1, said display device comprising a pair of moelecular oreintation layers interposed between said liquid crystal layer and said electrodes, respectively.

4. An elevator as claimed in claim 1 wherein one of said balustrade side panels is transparent and said display device is mounted on said transparent balustrade side panel.

5. An elevator as claimed in claim 4 wherein said escalator has two operation modes, one for ordinary passenger conveyance operation and the other for a special wheelchair conveyance operation, and wherein said display device displays the matters to be noted by means of said liquid crystal layer during the wheelchair conveyance operation mode of said escalator.

* * * * *